United States Patent [19]

Helfer et al.

[11] Patent Number: 5,060,462

[45] Date of Patent: Oct. 29, 1991

[54] MOWER HAVING A LIGHTENING MECHANISM

[75] Inventors: Roland Helfer, Lampertheim; Bernard Wattron, Saverne, both of France

[73] Assignee: Kuhn S.A., Saverne, France

[21] Appl. No.: 617,581

[22] Filed: Nov. 26, 1990

[30] Foreign Application Priority Data

Nov. 24, 1989 [FR] France ................. 89 15686

[51] Int. Cl.$^5$ .................. A01D 34/66; A01D 34/74; A01D 34/76; A01D 67/00
[52] U.S. Cl. .................. 56/14.9; 56/15.3; 56/15.5; 56/15.8; 56/16.4; 56/DIG. 10
[58] Field of Search .................. 56/14.9, 15.3, 15.7, 56/15.8, 157, 255, 295, 12.6, 15.5, 208, 16.4, DIG. 10

[56] References Cited

U.S. PATENT DOCUMENTS

| | | | |
|---|---|---|---|
| 3,783,594 | 1/1974 | Watt et al. | 56/15.8 |
| 3,808,781 | 5/1974 | Bass et al. | 56/15.8 X |
| 4,719,742 | 1/1988 | Kuhn | 56/16.4 |
| 4,724,661 | 2/1988 | Blakeslee et al. | 56/208 |
| 4,991,383 | 2/1991 | Ermarcora | 56/14.9 |

FOREIGN PATENT DOCUMENTS

| | | |
|---|---|---|
| 2614755 | 11/1988 | France . |
| 8701155 | 12/1988 | Netherlands . |
| 1583983 | 2/1981 | United Kingdom . |
| 2053645 | 11/1981 | United Kingdom . |

*Primary Examiner*—Stephen J. Novosad
*Attorney, Agent, or Firm*—Oblon, Spivak, McClelland, Maier & Neustadt

[57] ABSTRACT

A mower includes a frame having a connecting mechanism for connecting the frame to a motor vehicle. The mower also includes at least one harvesting mechanism which comprises cutting elements and is connected to the frame through a suspension device. The suspension device permits the displacement in height of the harvesting mechanism relative to the frame. The mower further includes a lightening device operatively connected to the harvesting mechanism and comprising at least one spring connected directly to the harvesting mechanism. The lightening device makes it possible to reduce the pressure with which the harvesting mechanism rests on the ground by transferring a part of the weight of the harvesting mechanism to the frame.

24 Claims, 4 Drawing Sheets

MOWER HAVING A LIGHTENING MECHANISM

BACKGROUND OF THE INVENTION

1. Field of the Invention

This invention relates to a mower comprising a frame equipped with a connecting device for connecting the frame to a motor vehicle, at least one harvesting mechanism equipped in particular with cutting elements and connected to the frame by a suspension device which allows a displacement in height of the harvesting mechanism relative to the frame, and a lightening device combined with the harvesting mechanism comprising at least one spring connected directly to the harvesting mechanism.

2. Description of the Related Art

A pulled mower comprising a frame which extends crosswise to the direction of advance at work is known. At each of its ends, this frame is equipped with a wheel by which it rests on the ground. In the median part, the frame is equipped with a tongue which makes it possible to hitch the mower to a tractor and which is connected to the frame by a joint with an axis directed at least approximately vertically. The frame supports a harvesting mechanism by a suspension device defining a deformable parallelogram. This device comprises two pairs of connecting rods each extending near one end of the frame, respectively of the harvesting mechanism. Moreover, a lightening device of the harvesting mechanism extends between the harvesting mechanism and the frame. This lightening device comprises two draw springs each extending near one end of the frame, respectively of the cutting mechanism, in front of the corresponding pair of connecting rods of the deformable parallelogram suspension device. Each draw spring is directly connected to the harvesting mechanism by a bolt going through a lug integral with the harvesting mechanism and screwed into a connecting piece integral with the spring. By screwing the bolt more or less tightly into the connecting piece of the spring, the spring is more or less extended, which makes it possible to adjust the lightening desired at the corresponding end of the harvesting mechanism. Because of the deformable parallelogram suspension device, the harvesting mechanism can be displaced in height relative to the frame, to adapt itself to the configurations of the soil and to pass above the obstacles that the soil can present. The lightening device makes it possible to reduce the pressure with which the harvesting mechanism rests on the ground, by transferring a part of the weight of the harvesting mechanism to the frame. Because of this device, the harvesting mechanism passes more easily above obstacles that the soil presents. Since the harvesting mechanism rests less heavily on the ground, a reduction of the power necessary to the displacement of the mower is also derived from it. In case the harvesting mechanism comprises a support beam extending under the cutting elements by supporting the latter and sliding over the ground, it finally makes it possible to reduce the risks of accumulations of earth at the front part of the support beam.

The advantage of the lightening device of this known mower resides in the fact that the springs are directly connected to the harvesting mechanism. This actually makes it possible for the lightening device to work with extremely short response times.

In practice, however, it was proven that this lightening device was not optimal. Actually, taking into account the usual production tolerances of the springs, variations in characteristics of the metal due to heat treatment, of the extent of the prestressing, etc., springs responding dimensionally to a given design can have characteristics which differ in appreciable proportions. Consequently, a problem occurs in that the two ends of the harvesting mechanism can rest with different pressures on the ground. The system of adjustment of the tension of each spring makes it possible theoretically to equalize the pressures with which the ends of the harvesting mechanism rest on the ground. This would require, however, a measuring device that the user generally does not have. Moreover, when one of the ends of the harvesting mechanism passes above an obstacle, the two ends of the harvesting mechanism also rest with different pressures on the ground.

In practice, it is therefore found that the harvesting mechanism is often very imperfectly lightened.

SUMMARY OF THE INVENTION

Accordingly, an object of this invention is to provide for a mower whose lightening device better lightens the harvesting mechanism, while keeping the advantage of a very short response time.

For this purpose, the mower according to the present invention is characterized by the fact that the lightening device extends at least approximately in the vicinity of the vertical plane directed in the direction of advance at work and containing the center of weight of the harvesting mechanism.

Since the lightening device is directly connected to the harvesting mechanism in the mower according to the invention, the lightening device works with very short response times.

Additionally, because the lightening device extends at least approximately in the vicinity of the vertical plane directed in the direction of advance at work and containing the center of weight of the harvesting mechanism, the pressures with which the two ends of the harvesting mechanism rest on the ground are equal or at the very least very close to one another.

According to an additional characteristic of the invention, it is provided that the lightening device extends behind the cutting elements and is connected to the harvesting mechanism in the vicinity of the cutting plane of the cutting elements. Accordingly, the spring or springs of the lightening device can have a great length. As a result, their deformation diagram is relatively flat. Consequently, they allow a great displacement in height of the harvesting mechanism relative to the frame.

In this case, to prevent the cut product from reaching the zone of the lightening device and from remaining hooked to the latter, an advantageous solution consists in providing that, in front of the lightening device, the harvesting mechanism is provided with two rotors each rotating around an axis directed upward and so that their respective directions of rotation diverge forward.

For mowers of relatively large work width, it is advantageous that their harvesting mechanism comprises a cutting bar made in two cutting bar parts coupled to one another by a coupling element extending in the vicinity of the cutting plane of the cutting elements. In this case, it can advantageously be provided that the lightening device is connected directly to the coupling element.

To make it possible for the coupling element to absorb the stresses exerted by the lightening device, it can be provided in the invention that the coupling element is stiffened by a stiffening element.

In a preferred embodiment, this stiffening element is connected, on the one hand, to the harvesting mechanism by a first joint extending above the cutting elements and, on the other hand, to the coupling element by a second joint. A triangulation thus is formed which imparts a great rigidity to the coupling element.

According to another additional characteristic of the invention, it is provided that the lightening device is connected to the harvesting mechanism by a joint means preferably cylindrical, with an axis which is at least approximately horizontal and at least approximately perpendicular to the direction of advance at work. This type of connection involves, on the one hand, still shorter response times and prevents, on the other hand, in the case of draw springs, the bending of the latter.

In such an arrangement, it can be advantageously provided that the second joint, by which the stiffening element is connected to the coupling element, is at least approximately merged with the said joint means.

According to an additional characteristic of the invention, it is provided that the direction of the lightening force exerted by the lightening device on the harvesting mechanism is at least approximately tangent to the path described by the connecting point connecting the lightening device to the harvesting mechanism during its displacement in height allowed by the suspension device.

According to another additional characteristic of the invention, it is provided that the lightening device is provided with an adjusting device of the lightening force exerted on the harvesting mechanism.

According to another additional characteristic of the invention, the lightening device comprises a group of springs, whose one part extends on one side of the vertical plane directed in the direction of advance at work and containing the center of weight of the harvesting mechanism, and whose other part extends on the other side of the plane. Preferably, it is provided that these two parts are identical. Preferably, it is also provided that they extend at least approximately symmetrically relative to the plane.

In case of dispersion in the characteristics of the springs, the difference of the forces exerted by the two parts of the group of springs is not transferred integrally to the ends of the harvesting mechanism resting on the ground during work, but instead minimized in the "a/l" ratio in which "a" represents the distance between the two parts of the group of springs and "l" the width of the harvesting mechanism.

According to another characteristic, it is provided that all the springs of the group are connected to a common connecting piece, itself connected to the frame by the adjusting device making it possible to move the common connecting piece close to or away from the frame. This characteristic makes it possible to considerably simplify the use of the mower, since all the springs are adjusted simultaneously by a single adjusting device. The adjustment is therefore quicker while being certain that the ends of the harvesting mechanism rest on the ground with pressures which are equal or at the very least very close to one another.

In an embodiment of the present invention, it is provided that the adjusting device comprises in particular a bolt and nut device. This bolt extends at least approximately parallel to the springs and is connected to the frame. It is further screwed into a nut connected to the common connecting piece. To prevent bendings in the springs or in the bolt when the harvesting mechanism is displaced in height relative to the frame to follow the configuration of the ground, it is provided that the bolt comprises a spherical support face intended to come into contact with a support face of the frame, which is also spherical. Moreover, it is also provided that the nut also comprises a spherical support face intended to come into contact with a spherical support face of the common connecting piece. This joint has the effect, during the inclination of the harvesting mechanism relative to the frame, crosswise to the direction of advance at work, of making it possible for the common connecting piece to pivot to substantially equalize the forces created by the two parts of the group of springs on the harvesting mechanism.

According to another additional characteristic of the invention, the harvesting mechanism comprises drive elements which comprise in particular an input shaft receiving the movement by a universal joint telescopic transmission shaft which passes between the two parts of the group of springs.

According to another additional characteristic of the invention, the harvesting mechanism comprises, in addition, processing elements extending behind the cutting elements, for processing of the product cut by the cutting elements.

Advantageously, it is provided that the processing elements comprise two groups of processing elements extending on both sides of the median vertical plane of the harvesting mechanism, directed in the direction of advance at work. Preferably, moreover, it will be provided that the two groups of processing elements extend at least approximately symmetrically relative to the plane.

The lightening device of the harvesting mechanism can thus extend between these two groups of processing elements.

Accordingly, the present invention provides for a mower which is movable in a direction of advance during work. The mower comprising a frame having connecting means for connecting the frame to a motor vehicle; at least one harvesting mechanism comprising in particular cutting elements and connected to the frame through a suspension device, the suspension device permitting a displacement in height of the harvesting mechanism relative to the frame. The mower further comprises a lightening device operatively connected to the harvesting mechanism and comprising at least one spring directly connected to the harvesting mechanism. The lightening device at least approximately extending in a vicinity of a vertical plane which is directed in the direction of advance at work and which contains the center of weight of the harvesting mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
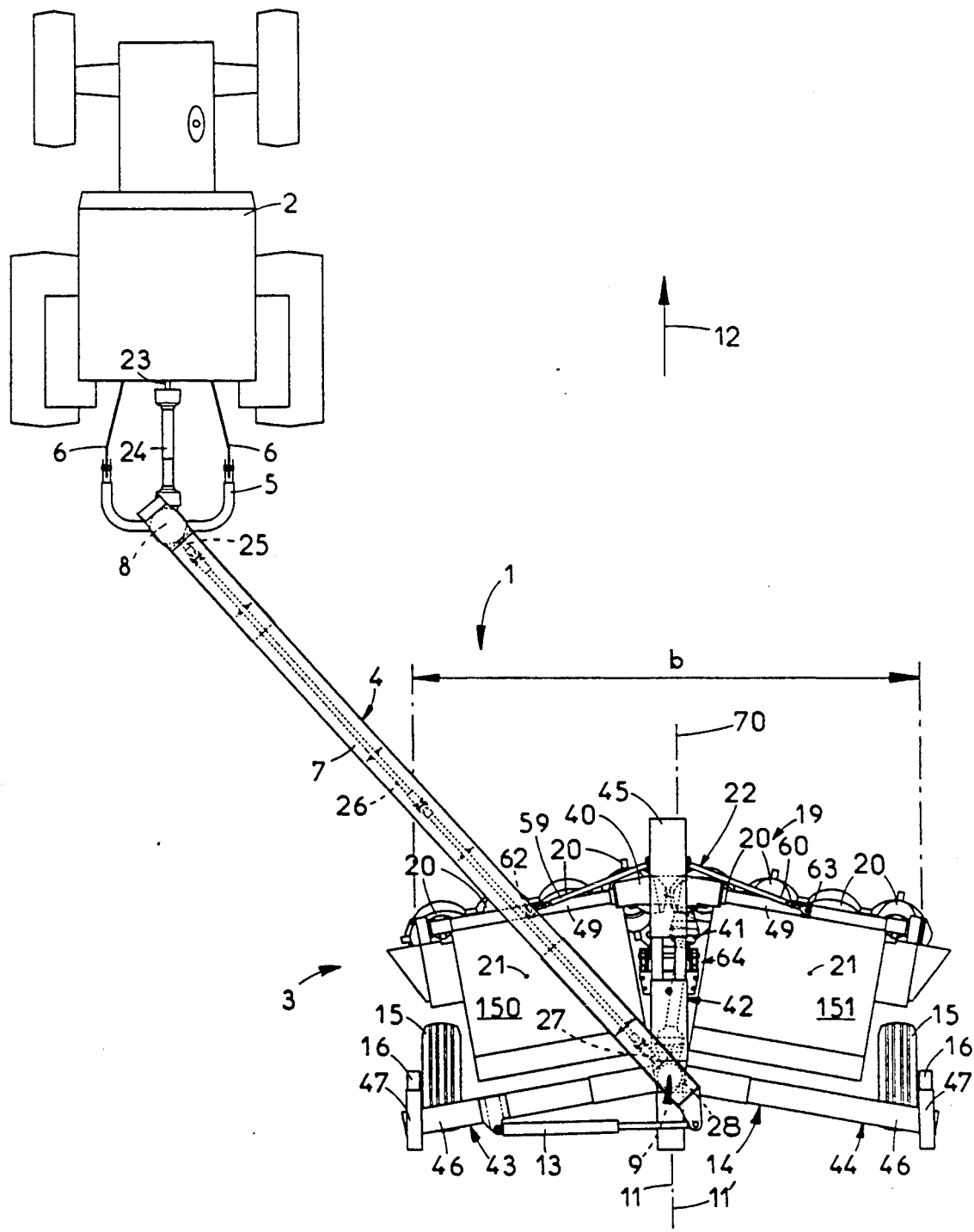
FIG. 1 shows a top view of a mower according to the invention hitched to a farm tractor.

Referring now to the drawings, wherein like reference numerals designate identical or corresponding parts throughout the several views, and more particularly to FIG. 1 thereof, FIG. 1 shows a mower (1) according to the invention. The latter is hitched to a farm tractor (2).

The mower (1) includes a body (3) and a tongue (4). Tongue (4) consists of a primary tongue (5) intended to be hitched to lower arms (6) of the hitch of farm tractor (2) and a secondary tongue (7) connected to body (3) of mower (1). Primary tongue (5) is connected to the front end of secondary tongue (7) by a connecting device (8) known to one skilled in the art and which allows in particular a pivoting of primary tongue (5) relative to secondary tongue (7) around a substantially vertical axis. Near its rear end, secondary tongue (7) is connected to body (3) by a joint (9) with a geometric axis (10) (see FIG. 2) which is at least approximately vertical and extends at least approximately in median vertical plane (11) of body (3), directed in a direction of advance (12) of work. The angular position of tongue (4) relative to body (3) can be modified by making tongue (4) pivot around axis (10) of joint (9). The desired angular positioning of the tongue (4) and the keeping of it in the latter are achieved by a hydraulic cylinder (13). Because of this arrangement, body (3) of mower (1) can, in particular during work, extend—as seen from the rear in the direction of advance (12) at work—either to the right or to the left of farm tractor (2). This allows back and forth mowing.

Body (3) of mower (1) comprises a frame (14) which rests on the ground—in particular during work—by two wheels (15) which each extend near a respective outside end of the frame (14). Each wheel (15) is connected to frame (14) by a wheel arm (16) itself connected to the frame (14) by a joint of pivot type (17) with a geometric axis directed at least substantially perpendicular to the direction of advance (12) at work. The geometric axes of joints (17) of the two wheels (15) are at least approximately merged. Between each wheel arm (16) and frame (14) is further provided a hydraulic cylinder (18) which makes it possible to make wheel arm (16) and corresponding wheel (15) pivot relative to frame (14) around the geometric axis of corresponding joint (17). This makes it possible for frame (14) to be moved close to ground (109) during the mowing phase and to be moved away from ground (109) when the mowing is stopped.

Body (3) of mower (1) further comprises a group of working elements which comprises a harvesting mechanism (19) equipped with cutting elements (20) and processing elements (21) of the product cut by cutting elements (20), such as conditioning elements, for example. This harvesting mechanism (19) is connected to frame (14) by a suspension device (22) and a lightening device (64), which will be described below.

Driving of harvesting mechanism (19) is achieved from power takeoff (23) of tractor (2) which drives, by a universal joint telescopic shaft (24), the input shaft (not shown) of connecting device (8) which is also, in a manner known to one skilled in the art, a device for transmission of the movement. Output shaft (25) of connecting and transmission device (8) transmits the movement to a transmission shaft (26) which is housed inside secondary tongue (7). Transmission shaft (26) is connected in rotation to input shaft (27) of an intermediate housing (28) which extends at the level of the connection of secondary tongue (7) to frame (14). This intermediate housing (28) (see FIG. 2) consists of two parts: an upper part (29) integral with secondary tongue (7) and a lower part (30) integral with frame (14). Upper part (29) supports, on the one hand, input shaft (27) and, on the other hand, an intermediate output shaft (31). These two shafts (27, 31) are connected in rotation by a bevel gear pair (32) housed in upper part (29). Lower part (30) supports, on the one hand, an intermediate input shaft (35) and, on the other hand, an output shaft (33). The two shafts (35, 33) are connected in rotation by a bevel gear pair (34) housed in lower part (30). Further, intermediate output shaft (31) and intermediate input shaft (35) are coupled to one another by a universal joint (36). Finally, these two intermediate shafts (31, 35) are arranged so that their respective axes of rotation are merged with geometric axis (10) of joint (9) by which tongue (4) is connected to frame (14) of body (3). This joint (9) is made in the following manner. At its rear end, secondary tongue (7) is equipped with a hub (37) centered on geometric axis (10) and extending downward. This hub (37) is guided in rotation in a bearing (38) also centered on geometric axis (10) and integral with frame (14). The guiding in rotation of hub (37) in bearing (38) just as the axial connection of the hub (37) and the bearing (38) have not been detailed, because the latter are within the scope of one skilled in the art. Output shaft (33) of lower part (30) of intermediate housing (28) drives input shaft (39) of input housing (40) of harvesting mechanism (19) by a universal joint telescopic transmission shaft (41).

In FIG. 1, the shape of frame (14) is illustrated. The latter essentially consists of a median element (42) and two lateral elements (43, 44), each extending on a respective side of the median element (42). Median element (42) consists mainly of bearing (38) and a bracket (45) which extends at least approximately horizontally and at least approximately in direction of advance (12) at work. The bracket (45) is advantageously connected rigidly but nevertheless in a removable manner to bearing (38). Lateral elements (43, 44) each consist of a beam (46) extending at least approximately horizontally and crosswise to direction of advance (12) at work, and at the outside end of which, i.e., the end distant from bearing (38), is attached a strut (47) extending downward. Wheel arm (16) of corresponding wheel (15) is connected at the lower end of this strut (47). Each lateral element (43, 44) is also connected rigidly and in a removable manner to bearing (38).

Figure 2:
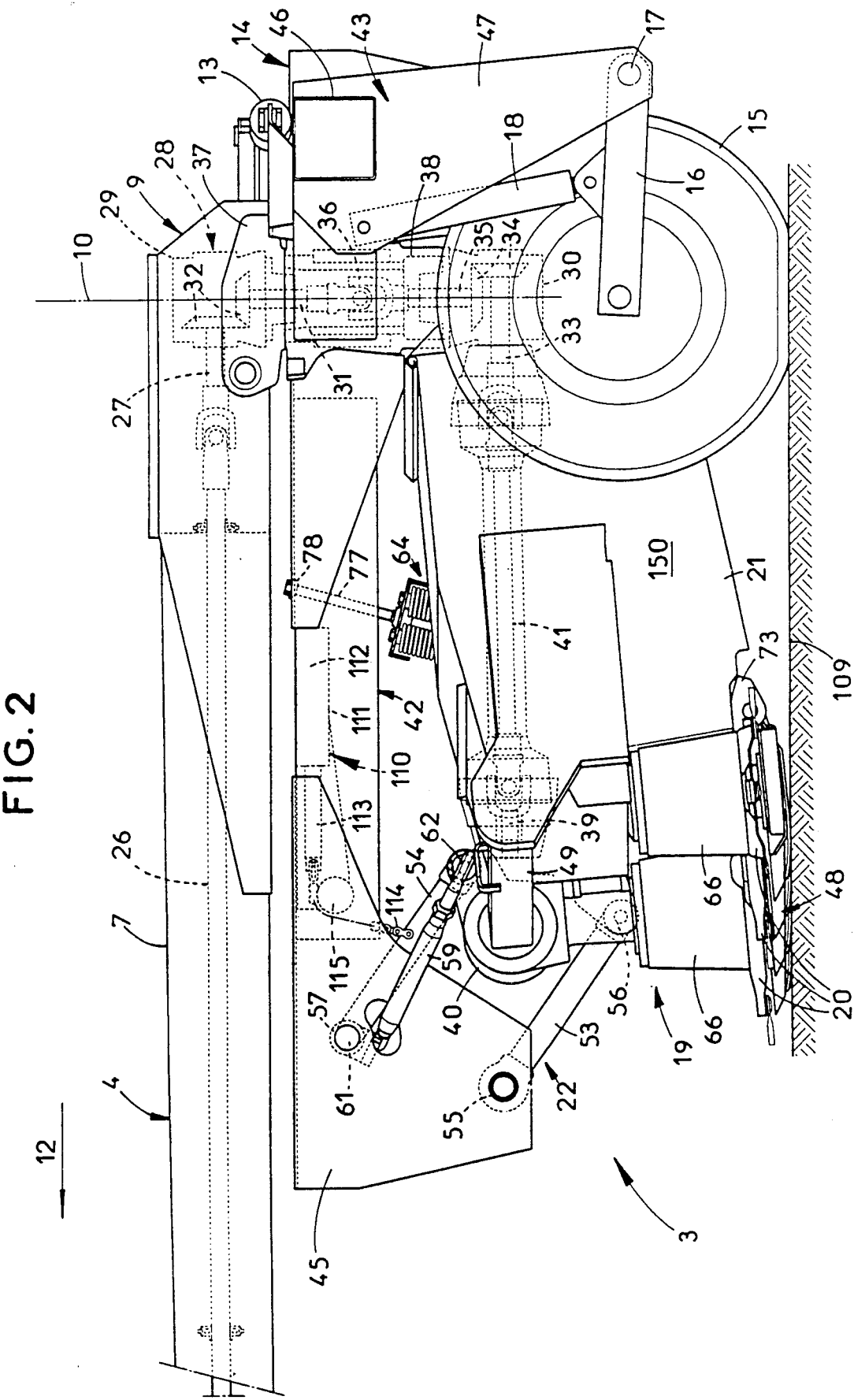
FIG. 2 shows a side view of the body of the mower of FIG. 1.
Figure 4:
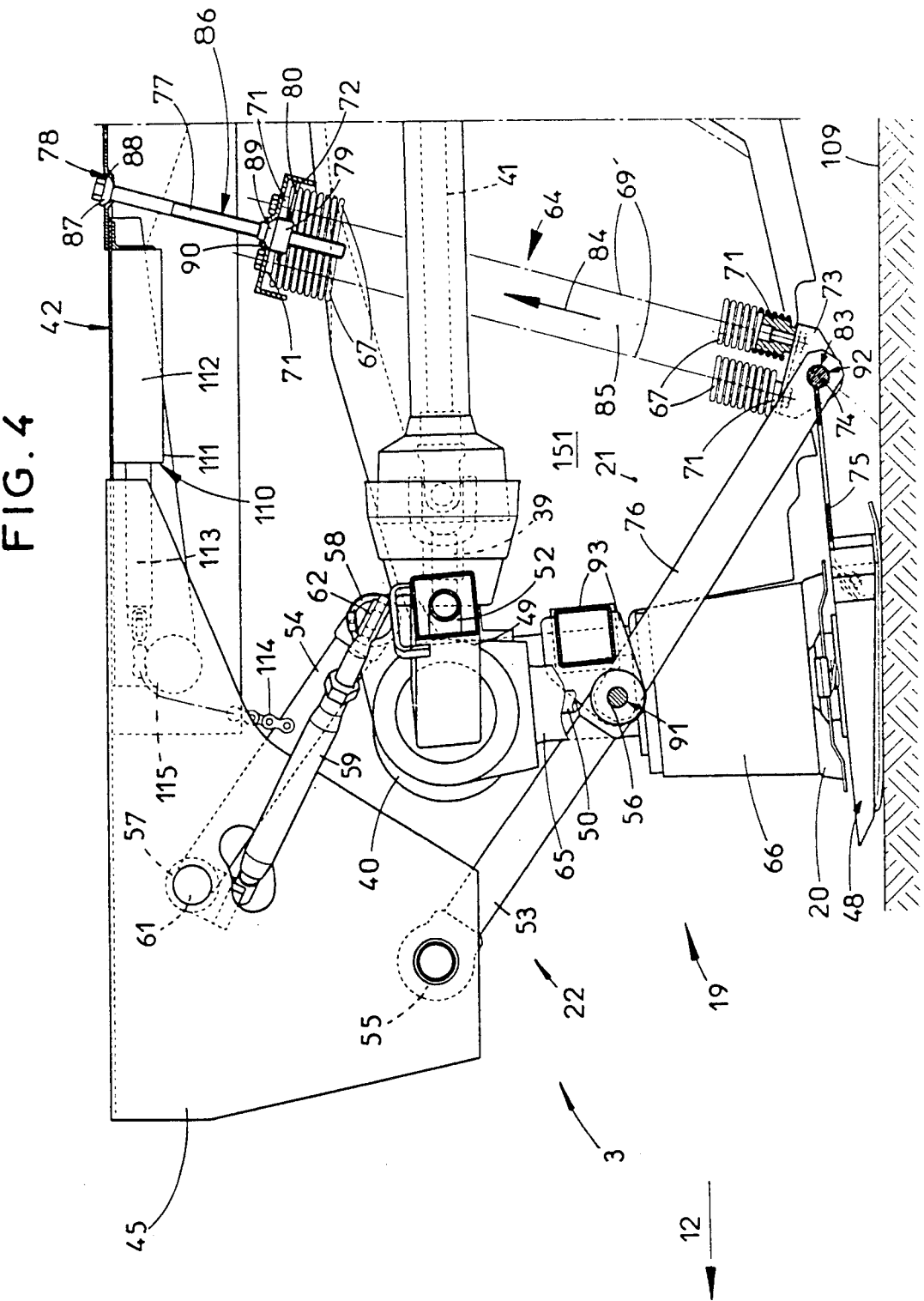
FIG. 4 shows a partial section of the body of the mower along plane IV—IV.

In FIGS. 1 and 2, it is further illustrated that harvesting mechanism (19) extends under bracket (45) of median element (42) of frame (14) and crosswise to the direction of advance at work. This harvesting mechanism (19) essentially consists of a cutting bar (48) supporting cutting elements (20), of input housing (40) and of two carrying structures (49) supporting in particular processing elements (21). Input housing (40) is located more precisely under bracket (45) and in median vertical plane (11') of harvesting mechanism (19 directed in direction of advance (12) at work. In the example shown, the median vertical plane (11') is merged with median vertical plane (11) of body (3). On both sides of this input housing (40), two carrying structures (49), arranged symmetrically relative to the median plane (11'), are connected in a removable way. These carrying structures (49) extend at least approximately horizontally and also at least approximately parallel to lateral elements (43, 44) of frame (14). Processing elements (21) are distributed in two groups (150, 151) of processing elements (21), each attached to a respective carrying structure (49) of harvesting mechanism (19). They extend behind cutting elements (20) for the purpose of processing of the product cut by the latter. The two groups of processing elements (150, 151) are, like carrying structures (49), arranged symmetrically relative to median plane (11') of harvesting mechanism (19). FIGS. 1 and 4 show that the movement of rotation transmitted by universal joint telescopic shaft (41) to input housing (40) of harvesting mechanism (19) is then sent to two first drive shafts (50) directed downward and to two other drive shafts (52) directed on both sides of the input housing (40). Two first drive shafts (50) each go through a respective central carrying element (65) before driving cutting elements (20) located on both sides of median plane (11'). Two other drive shafts (52) each pass inside respective carrying structure (49) of harvesting mechanism (19) to drive processing element (21) of the harvesting mechanism (19).

Suspension device (22) comprises two suspension elements (53, 54) which connect harvesting mechanism (19) to frame (14). First suspension element (53) is connected by two ball joint connections (55, 56), on the one hand, to bracket (45) of frame (14) and, on the other hand, to a crossbeam (93) of harvesting mechanism (19). Second suspension element (54) located above first suspension element (53) is connected to bracket (45) of frame (14) by a pivot connection (57), as well as to input housing (40) of harvesting mechanism (19) by a ball joint connection (58). These two suspension elements (53, 54) form a deformable parallelogram, at least approximately vertical, making possible a good adaptation of harvesting mechanism (19) to ground (109). This suspension device (22) also comprises two lateral suspension elements (59, 60). Each lateral suspension element (59, 60) is connected by a ball joint connection (61) to bracket (45) of frame (14) and by another ball joint connection (62, 63) to respective carrying structure (49) of harvesting mechanism (19). These two lateral suspension elements (59, 60) are arranged symmetrically on both sides of bracket (45) to prevent the pivoting of harvesting mechanism (19) around a straight line passing through the centers of two ball joint connections (56, 58). As a result, suspension device (22) only allows a displacement of harvesting mechanism (19) in a direction directed upward, as well as an inclination of the harvesting mechanism (19) relative to frame (14) crosswise to direction of advance (12) at work.

As can be seen in FIGS. 2 and 4, mower (1) also comprises a lifting device (110) of harvesting mechanism (19). This device mainly consists of a hydraulic cylinder (111), whose cylinder (112) is connected to frame (14) and whose rod (113) is connected to a chain (114). This chain (114) winds partially on a wheel (115) guided in rotation in frame (14) and is connected at its end distant from hydraulic cylinder (111) to second suspension element (54). During work, this lifting device (110) does not interfere with the displacement of harvesting mechanism (19) relative to frame (14). When harvesting mechanism (19) is to be lifted, it will be sufficient to make rod (113) return to cylinder (112) of hydraulic cylinder (111) by injecting fluid in the latter. By so doing, rod (113) pulls, via chain (114), on second suspension element (54), which has the effect of making harvesting mechanism (19) rise by deformation of the deformable parallelogram.

Figure 3:
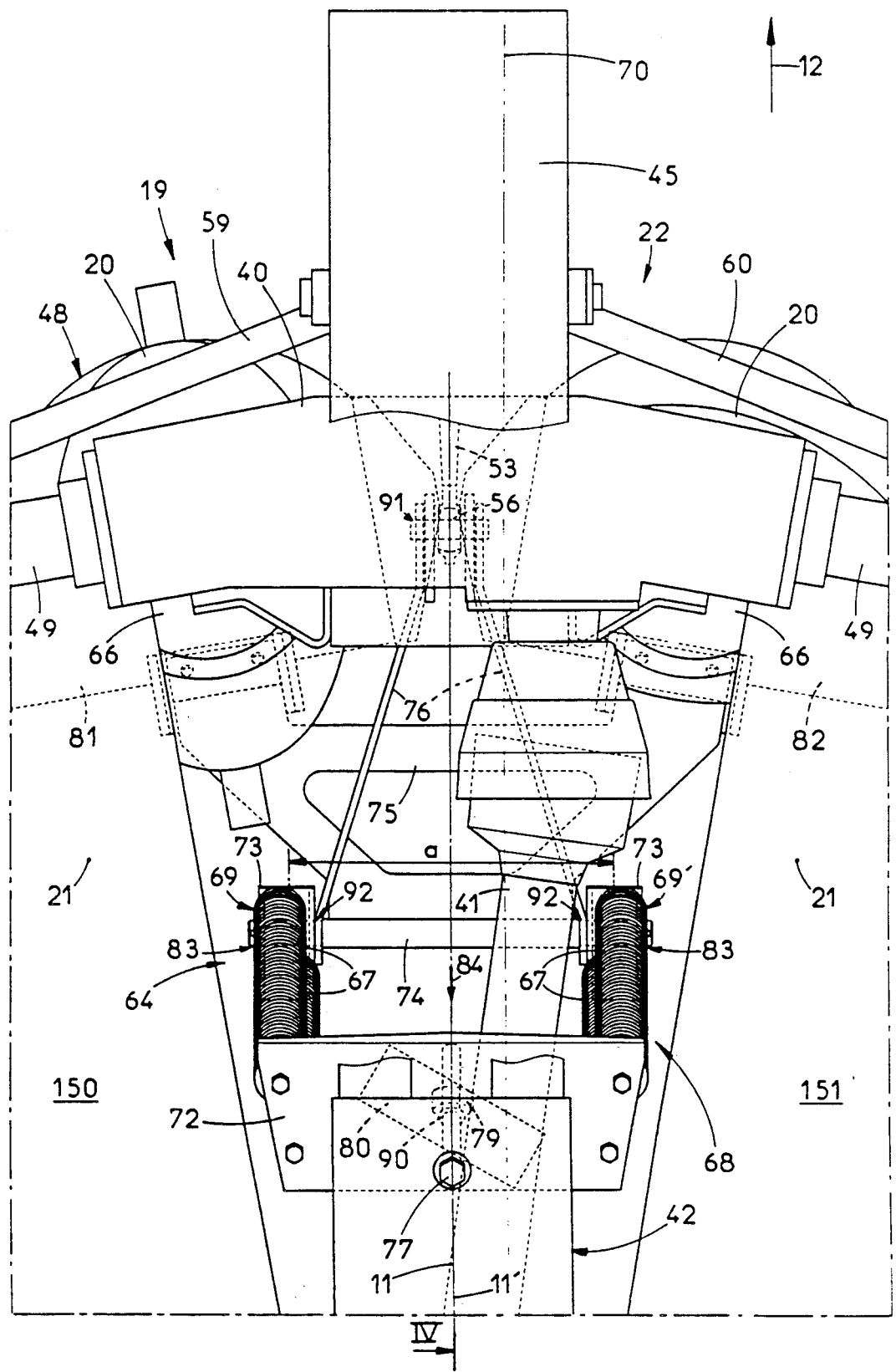
FIG. 3 shows a partial top view, on an enlarged scale, of the median part of the body of the mower shown in FIG. 1, a part of the median element of the frame having been partially removed.

A lightening device (64), whose structure comes out in detail in FIGS. 3 and 4, cooperates with suspension device (22). This lightening device (64) comprises a group (68) of four draw springs (67) located in the vicinity of vertical plane (70) directed in direction of advance (12) at work and containing the center of weight of harvesting mechanism (19). It can also be seen that the lightening device (64) extends between the two groups (150, 151) of processing elements (21) and just behind two rotors (66) extending near one another in the median part of cutting bar (48), symmetrically on both sides of median vertical plane (11') of harvesting mechanism (19) and each rotating around an axis directed upward, so that their respective directions of rotation diverge forward. The geometric axes of these draw springs (67) extend in parallel upward and are slightly inclined backward relative to direction of advance (12) at work. This group (68) of four draw springs (67) is divided into two identical parts (69, 69'), each comprising two of four springs (67). These parts (69, 69') extend approximately symmetrically on both sides of vertical plane (70). In the example shown, the plane (70) is very close to median plane (11') of harvesting mechanism (19). Moreover, in each part (69, 69'), two springs (67) extend, taking into account direction of advance (12) at work, one behind the other.

Inside each of the ends of draw springs (67) is screwed a connecting element (71) connecting the respective upper end of these springs (67) to a common connecting piece (72) and the respective lower end of the springs (67) to two yokes (73). Each yoke (73) is attached to a respective part (69, 69') of group (68) of four draw springs (67) and pivots on a journal (74) with a geometric axis which is at least approximately horizontal and at least approximately orthogonal to direction of advance (12) at work. This journal (74) is connected rigidly to the center of cutting bar (48) by a coupling element (75) arranged at least approximately parallel to two cutting planes generated by cutting elements (20), in the vicinity of the said cutting planes. Yokes (73) and journal (74) thus constitute a joint (83) by which lightening device (64) is connected to harvesting mechanism (19). Two stiffening members (76) extending forward and upward are connected at their rear ends to coupling element (75) by a joint (92) and at their front end to crossbeam (93) by a joint (91). It comes out, moreover, that joint (92) is merged with joint (83) connecting lightening device (64) to harvesting mechanism (19) and that joint (91) is located above cutting elements (20). Stiffening element thus constituted forms a triangulation intended to increase the rigidity of coupling element (75) also connecting to one another two cutting bar parts (81, 82) constituting cutting bar (48).

Common connecting piece (72), made from a plate bent in a "U" shape, is connected by its central inside face to connecting elements (71) provided at the upper ends of springs (67). This common connecting piece (72) thus defined comprises in its center a circular hole surrounded by a spherical support face (90) whose concavity is directed downward. The circular hole is penetrated by a bolt (77) connected by a joint (78) of the ball joint type to bracket (45) of frame (14). For this purpose, bolt (77) comprises a spherical support face (87) cooperating with a spherical support face (88) of bracket (45). This bolt (77) extends at least approximately parallel to springs (67) and comprises a nut (79) with a spherical support face (89) cooperating with spherical support face (90) of common connecting piece (72). Nut (79) is also equipped with a rectangular sheet (80), with a length greater than the width of common connecting piece (72). As a result, the rotation of nut (79) is prevented by the flanges of common connecting piece (72) during the rotation of bolt (77).

Adjusting device (86) thus formed makes it possible, by rotating bolt (77) in one direction or in the other, to translate common connecting piece (72) and to extend, more or less, springs (67) to modulate the lightening of harvesting mechanism (19). In addition, during the inclination of harvesting mechanism (19) relative to frame (14) crosswise to direction of advance (12) at work, the ball joint connection between nut (79) and common connecting piece (72) makes it possible by simple rotation of this common connecting piece (72) to remain approximately parallel to coupling element (75). Due to this system, the two parts (69, 69') of the group (68) of springs (67) keep at least approximately the same length. Thus, during the inclination of harvesting mechanism (19), a remarkable difference between the lightenings applied to the ends of harvesting mechanism (19) is not produced. Second ball joint connection (78) between bolt (77) and bracket (45) of frame (14) assisted by pivot connection (83) between lightening device (64) and harvesting mechanism (19) prevent the bending of group (68) of springs (67), by keeping the axes of springs (67) always at least approximately parallel to the axis of bolt (77) during all the displacements allowed by suspension device (22). In FIG. 4, it also comes out that the direction of lightening force (84) exerted by lightening device (64) on harvesting mechanism (19) is at least approximately tangent to path (85) described by joint (83) connecting lightening device (64) to harvesting mechanism (19), during its displacement in height allowed by suspension device (22).

As can be seen in the Figures, it has also been provided in the mower according to the invention that universal joint telescopic transmission shaft (41), which extends in a direction at least approximately parallel to direction of advance (12) at work, passes between the two parts (69, 69') of the group (68) of draw springs (67).

Various modifications are possible, in particular concerning the composition of various elements or by substitution of equivalent techniques, without thereby going outside the field of protection defined by the claims. Thus, in particular, in the embodiment described, it is perfectly possible to change the arrangement, the type and the number of springs (67), as soon as they are at least approximately in the vicinity of vertical plane (70) containing the center of weight of harvesting mechanism (19).

Obviously, numerous modifications and variations of the present invention are possible in light of the above teachings. It is therefore to be understood that within the scope of the appended claims, the invention may be practiced otherwise than a specifically described herein.

What is claimed as new and desired to be secured by letters patent of the United States is:

1. A mower which is movable in a direction of advance during work, comprising:
 a frame having connecting means for connecting said frame to a motor vehicle;
 at least one harvesting mechanism comprising in particular cutting elements and connected to said frame through a suspension device, said suspension device permitting a displacement in height of said harvesting mechanism relative to said frame; and
 a lightening device operatively connected to said harvesting mechanism and comprising at least one spring connected directly to said harvesting mechanism, said lightening device at least approximately extending in a vicinity of a vertical plane which is directed in said direction of advance at work and which contains the center of weight of said harvesting mechanism.

2. The mower according to claim 1, wherein the lightening device extends behind said cutting elements and is connected to said harvesting mechanism in the vicinity of a cutting plane of said cutting elements.

3. The mower according to claim 1, wherein the harvesting mechanism is provided, in front of the lightening device, with two rotors, each of said rotors rotating around an axis directed upward such that their respective directions of rotation diverge forward.

4. The mower according to claim 1, wherein the harvesting mechanism comprises a cutting bar made in two cutting bar parts coupled to one another by a coupling element extending in the vicinity of a cutting plane of the cutting elements and to which the lightening device is directly connected.

5. The mower according to claim 4, wherein the coupling element is stiffened by a stiffening element.

6. The mower according to claim 5, wherein the stiffening element is connected to the harvesting mechanism by a first joint extending above the cutting elements and to the coupling element by a second joint.

7. The mower according to claim 1, wherein the lightening device is connected to the harvesting mechanism by a joint means having an axis which is at least approximately horizontal and at least approximately perpendicular to said direction of advance during work.

8. The mower according to claim 6, wherein the lightening device is connected to the harvesting mechanism by a joint means having an axis which is at least approximately horizontal and at least approximately perpendicular to said direction of advance at work; and, wherein the second joint, through which the stiffening element is connected to the coupling element, is at least approximately merged with the joint means.

9. The mower according to claim 1, wherein a direction of a lightening force exerted by said lightening device on the harvesting mechanism is at least approximately tangent to a path defined by a connecting point connecting the lightening device to the harvesting mechanism, during its displacement in height allowed by the suspension device.

10. The mower according to claim 1, wherein the lightening device is provided with an adjusting device for adjusting a lightening force exerted on the harvesting mechanism.

11. The mower according to claim 1, wherein the lightening device comprises a group of springs, one part of said group extending on one side of the vertical plane directed in the direction of advance during work and containing the center of weight of the harvesting mechanism, the other part of said group extending on the other side of said plane.

12. The mower according to claim 11, wherein said two parts of said group of springs are identical.

13. The mower according to claim 12, wherein said two parts of said group of springs extend at least approximately symmetrical relative to the vertical plane directed in the direction of advance during work and containing the center of the weight of the harvesting mechanism.

14. The mower according to claim 11, wherein the lightening device is provided with an adjusting device for adjusting a lightening force exerted on the harvesting mechanism and wherein all of said springs are connected to a common connecting piece, said connecting piece being connected to the frame by said adjusting device to move said common connecting piece near to or away from the frame.

15. The mower according to claim 14, wherein the adjusting device comprises a bolt and nut device which comprises a bolt extending at least approximately parallel to said springs and connected to the frame, and a nut connected to the common connecting piece.

16. The mower according to claim 15, wherein said bolt comprises a spherical support face cooperating with a further support face, which is also spherical, of the frame.

17. The mower according to claim 15, wherein said nut comprises a spherical support face cooperating with a further support face, which is also spherical, of the common connecting piece.

18. The mower according to claim 11, wherein the harvesting mechanism comprises drive elements which comprise an input shaft for receiving a movement from a universal joint telescopic transmission shaft which passes between the two parts of the group of springs.

19. The mower according to claim 1, wherein said at least one spring is a draw spring.

20. The mower according to claim 1, wherein the harvesting mechanism further comprises processing elements extending behind the cutting elements for processing a product cut by the cutting elements.

21. The mower according to claim 20, wherein the processing elements comprise two groups of processing elements extending on both sides of a median vertical plane of the harvesting mechanism, directed in the direction of advance during work.

22. The mower according to claim 21, wherein said two groups of processing elements extend at least approximately symmetrical relative to said median vertical plane.

23. The mower according to claim 21, wherein the lightening device extends between said two groups of processing elements.

24. The mower according to claim 20, wherein the processing elements are conditioning elements of a product cut by the cutting elements.

* * * * *